Patented Oct. 19, 1937

2,096,534

UNITED STATES PATENT OFFICE 2,096,534

QUATERNARY AMMONIUM COMPOUNDS AND PROCESS OF MAKING SAME

Otto Bayer, Leverkusen-on-the-Rhine, Ferdinand Muenz, Frankfort-on-the-Main, and Karl Keller, Frankfort-on-the-Main-Fechenheim, Germany, assignors to General Aniline Works, Inc., New York, N. Y., a corporation of Delaware No Drawing. Application March 16, 1934, Serial No. 715,993. In Germany March 24, 1933

1 Claim. (Cl. 260—27)

Our invention relates to new quaternary ammonium compounds and process of making same.

By reacting with at least one molecular proportion of an aliphatic polyamine on compounds containing at least two acid groups, particularly the radicle of cyanuric acid, or containing at least one acid and one alkyl group valuable nitrogenous condensation products are obtained, being the subject matter of our copending application Serial No. 715,992, filed on the same date, which by further treating with alkylating or aralkylating agents yield new quaternary ammonium compounds of a particular technical value.

As suitable aliphatic polyamines higher polymeric alkylenediamine mixtures may be mentioned, as reaction components capable of introducing into the polyamine molecule at least two acid groups particularly cyanuric halides, oxalylchloride, benzene or naphthalene disulfochlorides, as second component acting as simultaneous acylating and alkylating agents, for instance chloroacetylchloride.

The further alkylating process may be carried out with one or consecutively with a plurality of alkylating or aralkylating agents, such as dimethyl-sulfate or benzyl chloride. So far as starting materials containing hydroxyl groups are used, they may be converted into sulfonic acid esters by the action of arylsulfochlorides and the esters formed may be added to a tertiary base such as pyridine.

The new quaternary ammonium compounds are distinguished by the valuable property of rendering dyestuffs insoluble and of improving their fastness, so that on after-treatment therewith colored-substances and dyeings which have been prepared on textile materials particularly of vegetable origin by means of dyestuffs containing acid groups, the said dyestuffs are substantially improved as regards fastness to water, perspiration and boiling acids. In a surprising manner in many cases even the fastness to washing of such dyeings is essentially improved. The after-treatment of the dyeings may be carried out in alkaline or also in acid or neutral bath with or without the addition of further agents.

In order to further illustrate our invention the following examples are given; but we wish it, however, to be understood that our invention is not limited to the particular products or reacting conditions stated therein.

Example 1

To a mixture of 150 parts of trichloroethylene with 75 parts of a polyethylene polyamine-mixture, which is obtained by acting with ammonia on ethylene chloride (see Berichte, vol. 23, page 3711) and boils under a pressure of 15 mm. between 90° C. and above 350° C., at about 60° C. to 65° C. while stirring a solution of 55.5 parts of cyanuric chloride in about 450 parts of trichloroethylene is added. Then the mass is held at this temperature for about two further hours, the solvent is distilled off with steam and the precipitated condensation product is filtered off and dried. An excess of polyethylene polyamine may be isolated from the aqueous filtrate by adding a concentrated caustic soda solution thereto. The new condensation product represents a white powder insoluble in the usual solvents. It contains about 13% of chlorine and 36% of nitrogen.

When boiling it with dilute caustic alkali solutions a similar compound is obtained in which probably the residual chlorine is replaced by hydroxy-groups.

A product which is practically free from chlorine is obtained when carrying out the condensation of cyanuric chloride with polyethylene polyamine with the addition of a sodium carbonate solution.

When using instead of cyanuric trichloride for instance cyanuric acid dichloride or cyanuric acid amide dichloride analogous products are obtained.

Instead of this solution of cyanuric chloride in organic solvents likewise there may be used an aqueous suspension of cyanuric chloride obtainable for instance by pouring a concentrated solution thereof in acetone into water. In this case the condensation may be carried out advantageously at somewhat lower temperatures.

30 parts of the condensation product obtained according to the first paragraph of this example are gradually mixed with 30 parts of ethyleneoxide and the mixture is heated while stirring in an autoclave for 5 to 6 hours at 100° C. to 140° C.

In this manner a yellowish clear sirupy substance is obtained which is entirely soluble in water.

Instead of ethyleneoxide other alkyleneoxides such as propyleneoxide, butyleneoxide, glycide and the like are useful.

Into 58 parts of the above condensation product while stirring and cooling at the beginning at about 60° C. slowly 86 parts of dimethyl-sulfate (which is free from acids) are allowed to flow in, then shortly the temperature of the mixture is increased to about 75° C. and after cooling down at about 60° C. a solution of 35 parts of sodium carbonate in about 200 parts of water is added.

After stirring for some time and cooling down the crystallizing inorganic salts are removed by filtration. The solution of the quaternary ammonium salt thus obtained of a slight alkaline reaction may be evaporated partly or used immediately.

For aftertreating dyeings therewith one may proceed for instance as follows:

10 kgs. of cotton are dyed as usually with 3% of Sirius blue BR (Schultz, Farbstofftabellen, 7th edition, second volume, page 197), then rinsed and centrifuged. Then they are aftertreated with about 200 liters of a bath containing per liter 2 to 3 grs. of the aforesaid dilute solution. The material is handled therein at about 35° C. for about half an hour, rinsed, centrifuged and dried.

The dyeings thus obtained have an increased fastness to boiling acids, to water and surprisingly to washing.

Example 2

40.5 parts of polyethylenepolyamine mixture, which boils under 6 mm. pressure from 90° C. to above 250° C., are dissolved in about 100 parts of trichloroethylene or chloroform, then while stirring at about 20° C. to 25° C. 80 parts of hydrochloric acid of 30% strength and subsequently at about 15° C. to 20° C. during about 2 to 3 hours a solution of 18.5 parts of cyanuric chloride in about 200 parts of trichloroethylene or chloroform is added. Then slowly a concentrated solution of 160 parts of crystallized sodium acetate is added and the mass is finally neutralized with an aqueous solution of 58 parts of sodium carbonate during about 3 hours. The solvent is removed by distillation with steam, the remaining solution is evaporated partly and when cool the crystallizing inorganic salts are removed by filtration. The isolated free base represents a brownish viscous oil.

To this solution at about 60° C. during 4 to 5 hours about 120 parts of dimethylsulfate are added care being taken to preserve a continuous alkaline reaction by adding in portions a concentrated sodium carbonate solution. The reaction mass is then stirred for about 1 hour at 70-80° C. and after cooling the precipitated inorganic salts are removed by filtration. The filtrate may be more highly concentrated by evaporation. By adding a concentrated caustic soda lye the quaternary ammonium compound formed may be isolated as a brownish substance of salve-like consistency.

The conversion of the secondary amino-groups being substantially present in the molecule of the condensation product over tertiary amino-groups into quaternary ammonium groups which thus occurs in one operation may be carried out likewise in two steps, for instance in such a manner, that at first by means of other agents such as chlormethyl, methylalcohol and hydrochloric acid, benzylchloride the tertiary base is formed and then dimethylsulfate is added thereto in the usual manner; of course in this case only a part of the above quantity of dimethylsulfate is necessary.

The after-treatment of dyeings with this product may be carried out as follows:

10 kgs. of cotton yarn which has been previously dyed with a suitable red substantive dyestuff, are aftertreated at 35-40° C. for about half an hour in a bath of about twenty times the volume, containing about 1.5-3 grs. of the aforesaid quaternary base of about 30% strength per liter.

Example 3

10 kgs. of cotton are dyed with 3% of Sirius blue BR (Schultz, Farbstofftabellen, volume 2, page 197) and aftertreated as described in Example 1 with a bath containing 3 to 5 grs. per liter of a solution containing 10% of a quaternary ammonium compound obtained by condensing cyanuric-dimonoethanolamine-monochloride with polyethylenepolyamine and further alkylating the condensation product thus formed for instance by means of dimethylsulfate or p-toluenesulfonic acid methyl ester. The dyeings thus aftertreated are distinguished by a better fastness to boiling acids, water and washing.

Example 4

To a solution of 99.2 parts of a polyamine mixture in about 125 parts of trichloroethylene a solution of 19 parts of oxalylchloride in about 120 parts of trichloroethylene is slowly added while stirring at 20° C. to 30° C. and the temperature of the mixture is increased to 60° C. to 70° C. After having distilled off the trichloroethylene the new condensation product is obtained as hydrochloride as a yellowish sirupy substance which may be converted into the free base by adding a sodium carbonate solution. The salt as well as the free base are easily soluble in water.

The condensation products, obtained by acting on polyamines with polyvalent aliphatic compounds such as cyanuric acid chloride or oxalyl chloride or biuret and converting the condensation products thus obtained into the quaternary ammonium compounds, are most valuable. They are, therefore, preferably claimed in the following claim.

By treating the said aqueous solution with dimethylsulfate with addition of sodium carbonate a quaternary ammonium compound is obtained.

10 kgs. of a cotton material which has been previously dyed with 3% of Sirius-blue (1 c.) are aftertreated for 20 to 30 minutes at about 30° C. to 35° C. with about the twentyfold quantity of a bath containing 300 grs. of a solution containing 10% of the said quaternary ammonium salt. The aftertreated material shows the above cited better fastness.

When using a corresponding quantity of a quaternary ammonium compound obtained from the condensation product of polyethylene polyamine and chloroacetylchloride a likewise better fastness to washing of dyeings aftertreated therewith is obtained.

Example 5

146 parts of polyethylenepolyamine are mixed with 35 parts of biuret or the double quantity of crude biuret, obtained by introducing chlorine into molten urea at 130° C. to 120° C. and the mixture is heated for some hours at 135° C. to 140° C. While splitting off ammonia condensation takes place. When cool the condensation product is obtained as a light brown sirup-like substance.

By treating an aqueous solution of the said product in the usual manner with dimethylsulfate with the addition of sodium carbonate an aqueous solution of the methylsulfuric acid salt of an ammonium base is obtained.

10 kgs. of cotton yarn, which has been previously dyed with a suitable dyestuff, are aftertreated with 200 kgs. of a bath, containing per liter 1 gr. sodium carbonate and 1.5 to 2 grs. of a solution, containing 10% of the said ammonium compound. The aftertreated material is distinguished by a good fastness to boiling soap or soap and sodium carbonate solutions.

We claim:

The quaternary ammonium compound being brownish sirup-like substance, capable of forming insoluble color lakes with dyestuffs containing acid groups and being useful as valuable agent for aftertreating dyeings obtained on cellulosic materials, which product is obtained by reacting with a polyethylene-polyamine-mixture, which boils under 6 mm. pressure from 90° C. to over 250° C., on cyanuric chloride in an acid medium and treating the condensation product thus formed with dimethylsulfate in the presence of an alkali.

OTTO BAYER.
FERDINAND MUENZ.
KARL KELLER.